(12) United States Patent
Yoshioka

(10) Patent No.: US 7,569,808 B2
(45) Date of Patent: Aug. 4, 2009

(54) ROTARY ENCODER, BELT CONVEYANCE APPARATUS, AND IMAGE FORMING APPARATUS

(75) Inventor: Hiroshi Yoshioka, Kanagawa-ken (JP)

(73) Assignee: Ricoh Company, Ltd., Tokyo (JP)

( * ) Notice: Subject to any disclaimer, the term of this patent is extended or adjusted under 35 U.S.C. 154(b) by 179 days.

(21) Appl. No.: 11/589,861

(22) Filed: Oct. 31, 2006

(65) Prior Publication Data

US 2007/0096018 A1 May 3, 2007

(30) Foreign Application Priority Data

Oct. 31, 2005 (JP) ............................. 2005-317364

(51) Int. Cl.
*G01D 5/34* (2006.01)
*G01D 5/36* (2006.01)
*G03G 15/01* (2006.01)

(52) U.S. Cl. ................... 250/231.14; 356/617; 341/13; 33/1 PT

(58) Field of Classification Search ................................ 250/231.14–231.18; 356/614–619; 341/13–16; 33/1 N, 1 PT
See application file for complete search history.

(56) References Cited

U.S. PATENT DOCUMENTS

| | | | | | |
|---|---|---|---|---|---|
| 3,693,024 | A | * | 9/1972 | Hulle et al. ............. | 250/231.15 |
| 4,338,517 | A | * | 7/1982 | Perrine ................... | 250/231.13 |
| 4,475,034 | A | * | 10/1984 | Maddox et al. ......... | 250/231.16 |
| 4,593,269 | A | * | 6/1986 | Nakamura et al. ...... | 341/13 |
| 4,740,691 | A | * | 4/1988 | Ushiyama ............... | 250/231.13 |
| 4,752,683 | A | * | 6/1988 | McGuire ................ | 250/231.14 |
| 5,045,691 | A | * | 9/1991 | Steward et al. ......... | 250/231.16 |
| 5,086,221 | A | * | 2/1992 | Ishihara et al. ......... | 250/231.13 |
| 5,155,401 | A | * | 10/1992 | Kanaya et al. .......... | 310/89 |
| 5,751,230 | A | * | 5/1998 | Brandestini ............. | 341/10 |
| 6,255,644 | B1 | * | 7/2001 | Taniguchi et al. ....... | 250/231.13 |
| 6,642,508 | B2 | * | 11/2003 | Setbacken et al. ...... | 250/231.13 |
| 6,862,926 | B2 | * | 3/2005 | Mukaiyama ............ | 73/114.26 |
| 6,946,979 | B1 | * | 9/2005 | Aikawa et al. .......... | 341/10 |
| 7,019,281 | B2 | * | 3/2006 | Igaki et al. ............. | 250/231.13 |
| 2007/0096018 | A1 | * | 5/2007 | Yoshioka ................ | 250/231.13 |

FOREIGN PATENT DOCUMENTS

| | | |
|---|---|---|
| CN | 2706356 Y | 6/2005 |
| JP | 58-009551 | 1/1983 |

(Continued)

*Primary Examiner*—John R Lee
(74) *Attorney, Agent, or Firm*—Oblon, Spivak, McClelland, Maier & Neustadt, P.C.

(57) ABSTRACT

A rotary encoder includes a shaft which serves as a rotation axis, a disc supporting plate fixed to the shaft, an encoder disc having a center hole, a first side face, and a second side face opposing the first side face, an elastic member contacting and pressing the second side face of the encoder disc, and a retaining member retaining the second side face of the encoder disc via the elastic member. The first side face is contacted with a surface of the disc supporting plate. The shaft is inserted into the hole. A belt conveyance apparatus includes an endless belt, a roller configured to rotate the endless belt, including a shaft and the rotary encoder. The rotary encoder is provided on the shaft of the roller. An electrophotographic image forming apparatus includes an image forming unit and the belt conveyance apparatus.

20 Claims, 8 Drawing Sheets

FOREIGN PATENT DOCUMENTS

| | | |
|---|---|---|
| JP | 61-163923 | 10/1986 |
| JP | 08-205479 | 8/1996 |
| JP | 2519765 | 9/1996 |
| JP | 10-000289 | 1/1998 |
| JP | 2004-257403 | 9/2004 |

\* cited by examiner

ROTARY ENCODER, BELT CONVEYANCE APPARATUS, AND IMAGE FORMING APPARATUS

BACKGROUND OF THE INVENTION

1. Field of the Invention

The present invention relates to a rotary encoder, a belt conveyance apparatus and an image forming apparatus including the rotary encoder, and more particularly to a rotary encoder reducible in size, a belt conveyance apparatus and an image forming apparatus including the rotary encoder.

2. Discussion of the Background

A background rotary encoder includes a shaft which serves as a rotation axis, a disc supporting plate which is fixed to the shaft and serves as a mechanism for reducing variations in rotation of a rotating body and controlling rotation speed of the rotating body, and an encoder disc. The shaft is inserted into the encoder disc. The encoder disc includes a first side face contacting the disc supporting plate and a second side face opposite to the first side face, which is retained by a retaining ring.

The encoder disc has a plurality of slits or transparent parts formed at regular intervals on a circumferential portion of the encoder disc rotating around a rotation center of the encoder disc. For example, a transmission encoder sensor including a light emitting element and a light receiving element, which are attached to a static member, is set such that the light emitting element and the light receiving element oppose each other while the circumferential portion having slits rotates therebetween. In the arrangement, when one of the slits of the rotated encoder disc is located at the sensor, light emitted from the light emitting element passes through the one of the slits and is sensed by the light receiving element. The rotary encoder further includes a drive motor for driving the shaft. In the rotary encoder with the above configuration, the drive motor is controlled according to light-on and light-off signals sensed by the light receiving element as the shaft rotates to control rotation speed and rotation variations of the rotating body.

In order for the light receiving element to properly sense rotation of the shaft, the encoder disc needs to be fixed in a manner such that the shaft does not deviate from the rotation axis.

A background encoder disc is fixed to a shaft while sandwiched by a core metal and a retaining ring provided on the shaft. Another background encoder disc is fixed to a shaft with an adhesive while sandwiched by a member for receiving a rotating slit plate and a retaining ring provided on the shaft to hold the encoder disc. Another background encoder disc is fixed to a hub via a packing.

The diameter of an encoder disc has been reduced along with reduction in size of a product including a rotary encoder. The distance between a transmission encoder sensor and a rotation axis of the encoder disc is reduced when the diameter of the encoder disc is reduced. As a result, the transmission encoder sensor may interfere with a coupling, a core metal, a packing, or the like, thereby hampering the reduction in size of the product.

Another background encoder disc is held by a shaft and a coupling including a buffer member. In the configuration, the encoder disc is coupled with the shaft via the pad (i.e., the encoder is not directly coupled with the shaft), and a drive mechanism for driving the shaft is separable from the encoder disc at the coupling. Therefore, there is concern about the reading precision of the encoder disc. Another background encoder disc includes a transmission encoder sensor arranged in a bearing system of a shaft. As the size of the bearing system is hardly reduced, the size of a rotary encoder of the background encoder disc can also be hardly reduced.

SUMMARY OF THE INVENTION

This patent specification describes a rotary encoder including a shaft configured to serve as a rotation axis, a disc supporting plate fixed to the shaft, an encoder disc having a center hole, a first side face, and a second side face opposing the first side face, wherein the first side face is contacted with a surface of the disc supporting plate and the shaft is inserted into the hole, an elastic member configured to contact and press the second side face of the encoder disc, and a retaining member configured to retain the second side face of the encoder disc via the elastic member.

This patent specification further describes a belt conveyance apparatus including an endless belt configured to circularly travel, and a roller configured to rotate the endless belt, including a shaft integrally formed with the roller, and the rotary encoder, wherein the rotary encoder is provided on the shaft of the roller.

This patent specification further describes an electrophotographic image forming apparatus including an image forming unit configured to form a toner image on a receiving material, and a transfer belt conveyance apparatus configured to transport the receiving material, wherein the transfer belt conveyance apparatus is the belt conveyance apparatus.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF PREFERRED EMBODIMENTS

Figure 1:
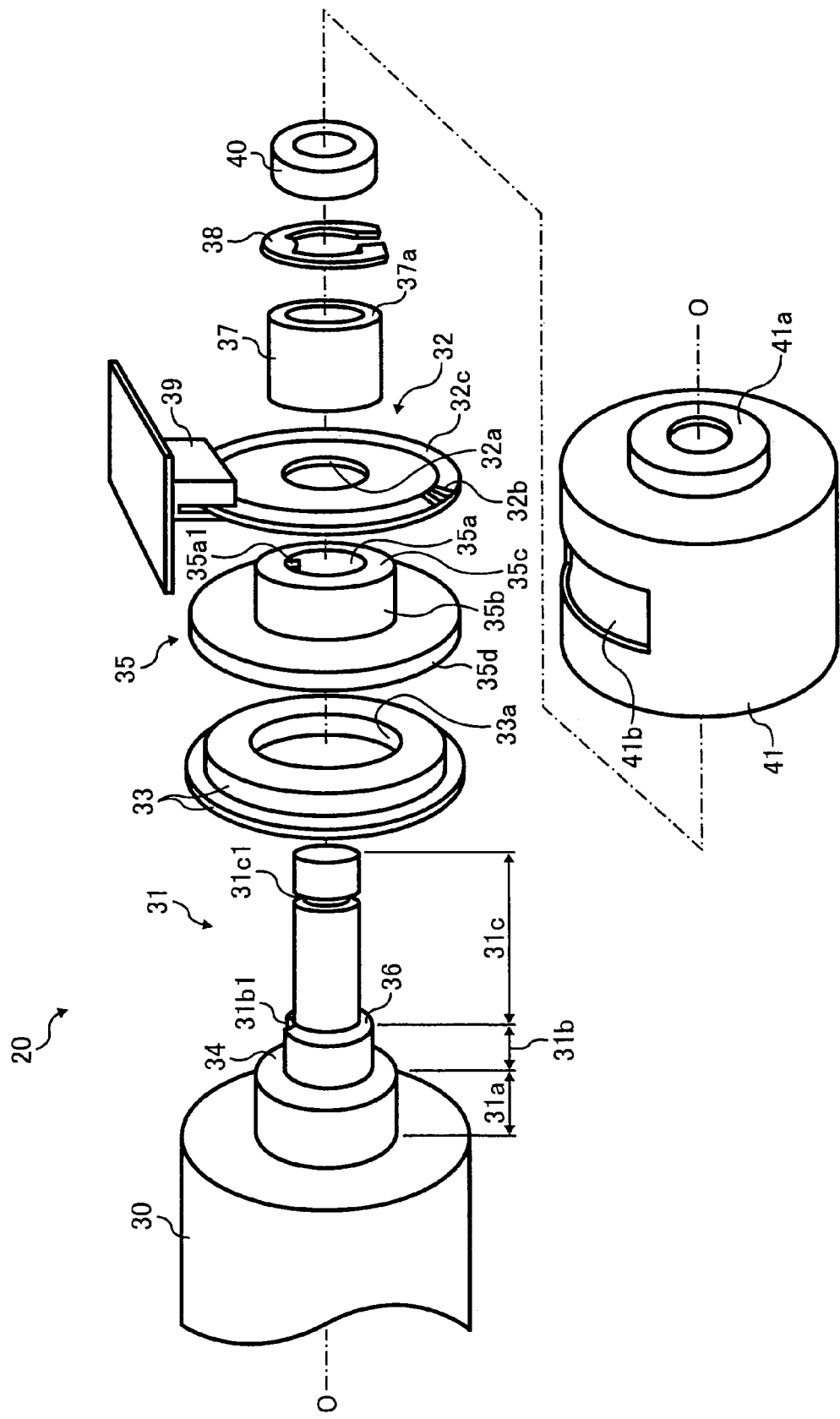
FIG. 1 is an exploded perspective view of major components of an exemplary rotary encoder according to an embodiment of the present invention.

In describing preferred embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner. Referring now to the drawings, wherein like reference numerals designate identical or corresponding parts throughout the several views, particularly to FIG. 1, a rotary encoder 20 according to an exemplary embodiment of the present invention is described.

Figure 2:
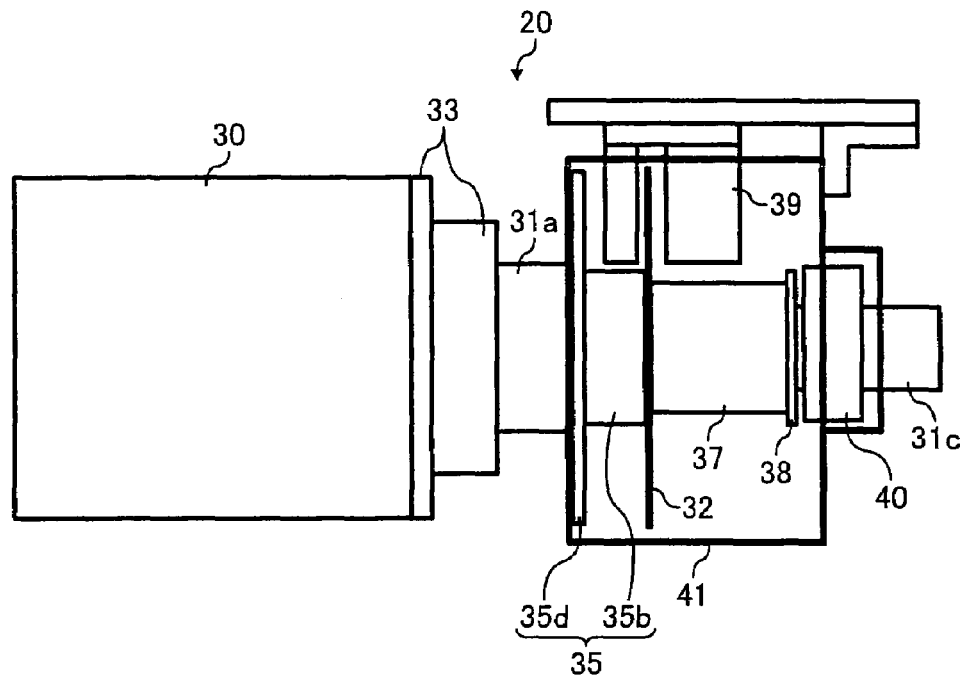
FIG. 2 is a front view of the major components of the rotary encoder shown in FIG. 1.
Figure 3:
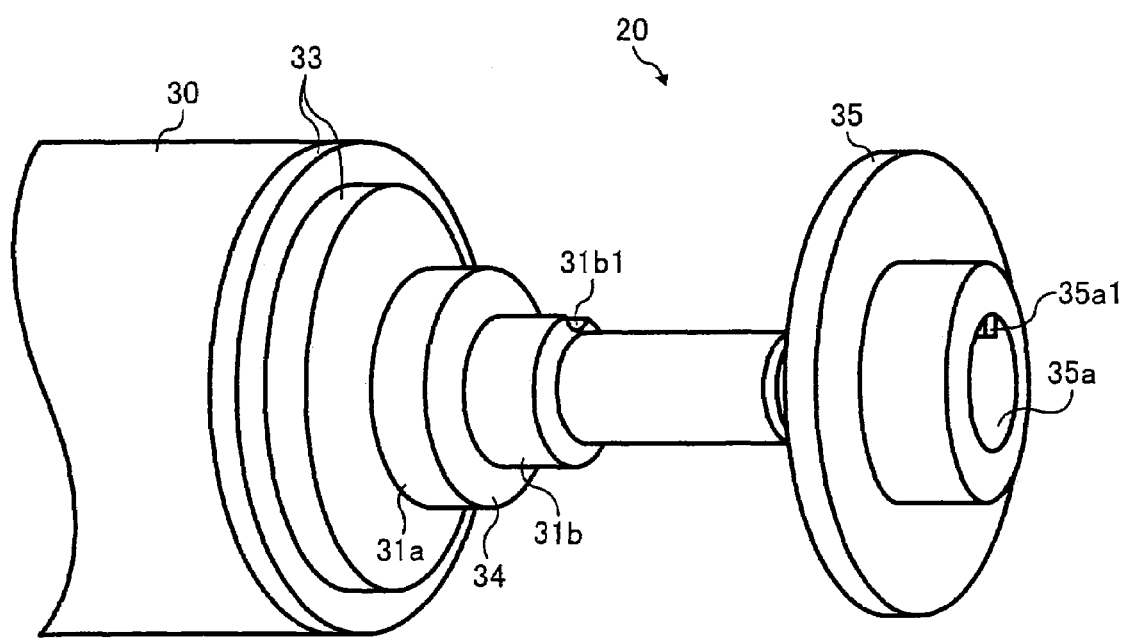
FIG. 3 is an enlarged partial perspective view of the rotary encoder shown in FIG. 1.

FIG. 1 is an exploded view of major components of the rotary encoder 20. FIG. 2 is a front view of the major components of the rotary encoder 20 in an assembled state. FIG. 3 is an enlarged perspective view of a part of the rotary encoder 20.

An exemplary configuration of the rotary encoder 20 is described below referring to FIGS. 1 to 3. As shown in FIG. 1, the rotary encoder 20 includes a roller 30, a shaft 31, an encoder disc 32 having a small diameter, a bearing roller 33, a first staged section 34, a disc supporting plate 35, a second staged section 36, an elastic member 37, a stop member 38 such as a retaining ring, an encoder sensor 39, a bearing 40, and a casing 41.

The shaft 31 includes a thick part 31a, a medium part 31b, and a thin part 31c located in the order from a side of the roller 30. The medium part 31b includes a key groove 31b1. The thin part 31c includes a stop groove 31c1.

The bearing roller 33 includes a mounting hole 33a. The disc supporting plate 35 includes a center hole 35a having a detent key 35a1, a boss part 35b having a boss end face 35c, and a flange part 35d.

The encoder disc 32 includes a center hole 32a, a plurality of sensor slits 32b, and a sensing area 32c. The elastic member 37 includes a center hole 37a. The casing 41 includes a bearing holding member 41a and an opening 41b.

The configuration of the rotary encoder 20 is described below in detail referring to FIGS. 1 to 3.

One end of the shaft 31 is integrally formed with the roller 30, of which rotation is sensed in order to eliminate irregularities in rotation and to control rotation speed. The shaft 31 has a rotation axis indicated by alternate long and short dashed lines shown in FIG. 1. A direction of the rotation axis is referred to as an axial direction. The shaft 31 becomes thinner toward the other end thereof. The thick part 31a has a diameter smaller than an outside diameter of the roller 30. The medium part 31b has a diameter smaller than the diameter of the thick part 31a. The thin part 31c has a diameter smaller than the diameter of the medium part 31b. The first staged section 34 is located on a border between the thick part 31a and the medium part 31b. The second staged section 36 is located on a border between the medium part 31b and the thin part 31c.

The thick part 31a of the shaft 31 is forcibly inserted into the mounting hole 33a of the bearing roller 33 for rotating the roller 30 so that the bearing roller 33 is integrally formed with the shaft 31. A left side face of the bearing roller 33 and a right side face of the roller 40 are in close contact with each other. In the embodiment, the bearing roller 33 has an outside diameter substantially equal to the outside diameter of the roller 30. Further, the bearing roller 33 has a thickness in the axial direction of the shaft 31 smaller than a length of the thick part 31a in the axial direction of the shaft 31. The bearing roller 33 is provided with a bearing (not shown) for rotatably supporting the roller 30.

The disc supporting plate 35 is provided for determining a position of the encoder disc 32. The flange part 35d is thin with a large diameter, and is located at a left part of the disc supporting plate 35. The boss part 35b is thick with a small diameter, and is located at a right part of the disc supporting plate 35. The boss end face 35c is a right end face of the boss part 35b. The medium part 31b of the shaft 31 is fitted into the center hole 35a of the disc supporting plate 35 with an end face of the flange part 35d forced to abut on the first staged section 34. The detent key 35a1 is formed inside the center hole 35a of the disc supporting plate 35 as shown in FIG. 3, and is forcibly inserted into the key groove 31b1 formed on an outer circumference of the medium part 31b to prevent the disc supporting plate 35 from rotating separately from the shaft 31. With the configuration, the disc supporting plate 35 is kept rotating along with the rotation of the shaft 31.

The length of the disc supporting plate 35 including the flange part 35d and the boss part 35b in the axial direction is slightly larger than a length of the medium part 31b in the axial direction. Therefore, the boss end face 35c of the disc supporting plate 35, when the disc supporting plate 35 is assembled with the shaft 31 with the flange part 35d forced to abut on the first staged section 34, is located at the right of the second staged section 36 in the axial direction.

The thin part 31c of the shaft 31 is fitted into the center hole 32a of the encoder disc 32 having a left end face attached to the boss end face 35c.

The elastic member 37 includes elastic material such as rubber and resin, and has a hollow cylindrical shape. An outside diameter of the elastic member 37 is larger than a diameter of the center hole 32a of the encoder disc 32. The elastic member 37 has outside dimensions such that the elastic member 37 does not interfere with the sensing area 32c where the plurality of sensor slits 32b are circularly arranged. The plurality of sensor slits 32b are arranged along a circle centering on the rotation axis of the shaft 31, and located on the periphery of the encoder disc 32. The thin part 31c of the shaft 31 is fitted into the center hole 37a of the elastic member 37 with a left end face of the elastic member 37 forced to abut on the boss end face 35c. The left end face of the elastic member 37 abuts on a right end face of the encoder disc 32. Pressure is applied to a right end face of the elastic member 37 in a compression direction. With the pressure being applied thereto, the elastic member 37 is retained with the stop member 38 engaged with the stop groove 31c1 formed on the thin part 31c of the shaft 31.

The bearing 40 rotatably supports the shaft 31 at the thin part 31c. The casing 40 has a tubular shape, and includes a circular opening at a left end thereof, and a right end face having the bearing holding member 41a. The bearing holding member 41a has a concave shape at an inner side of the casing 41 so that the bearing 40 can be received and held therein. The casing 41 further includes the opening 41b on an outside circumference thereof so that the encoder sensor 39 is externally inserted therethrough. The bearing 40 is forcibly inserted into the bearing holding member 41a so that the shaft 31 is rotatably supported at the thin part 31c.

The casing 41 is fixed to an appropriate anchor member (not shown) in a state in which the casing 41 covers the disc supporting plate 35, the encoder disc 32, the elastic member 37, the stop member 38, the bearing 40, and so forth. The encoder sensor 39 is fixed to the casing 41, and a part of the encoder sensor 39 is inserted into the casing 41 through the opening 41b, and is arranged such that the sensing area 32c of the encoder disc 32 is placed between a light emitting part and a light receiving part of the encoder sensor 39 opposing to each other.

Figure 4:
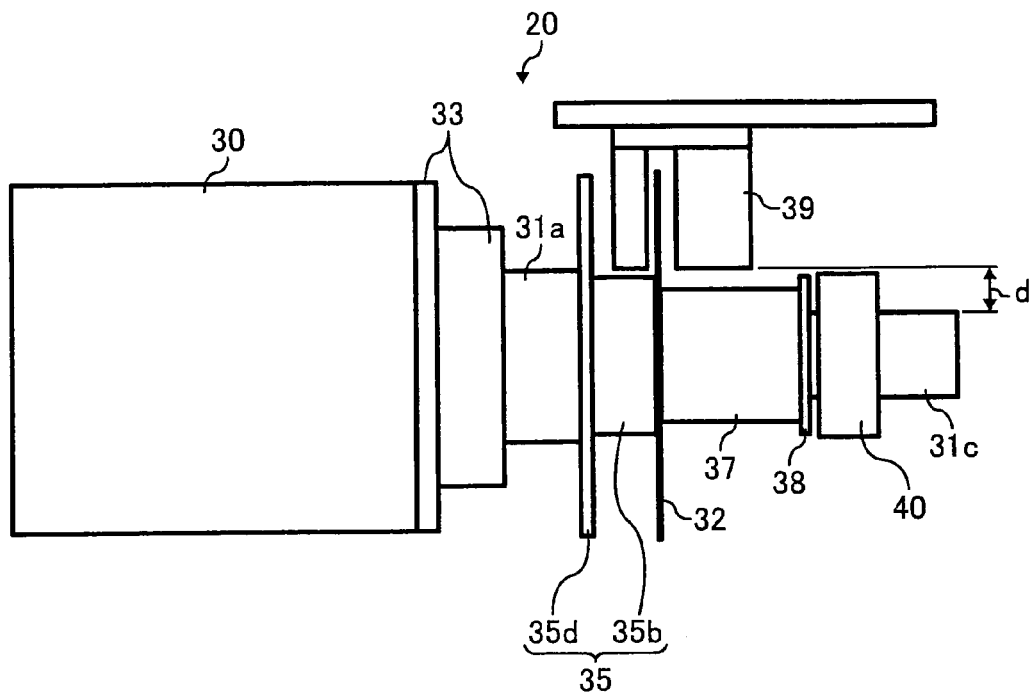
FIG. 4 is a front view of the major components of the rotary encoder shown in FIG. 1.
Figure 5:
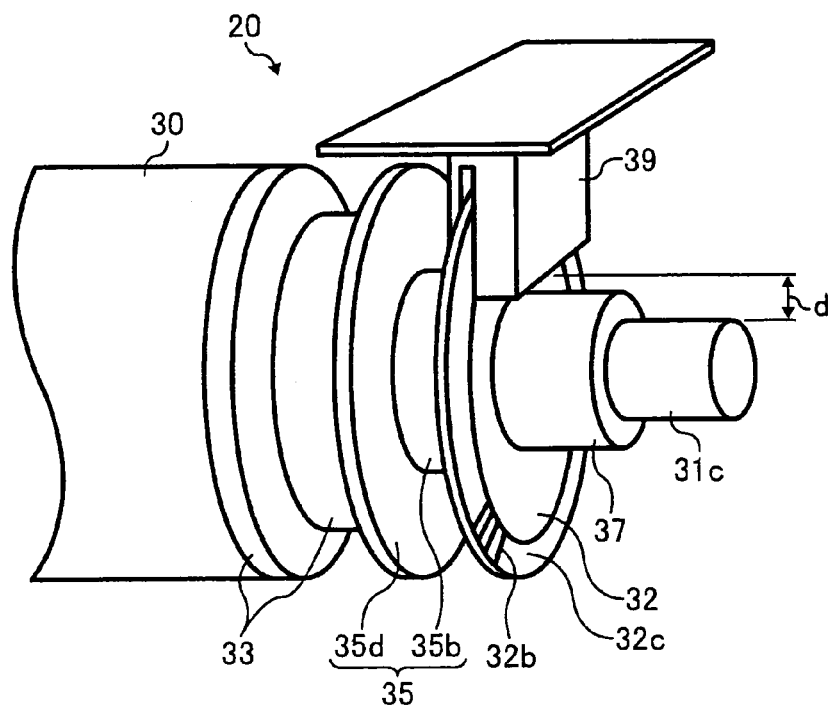
FIG. 5 is an enlarged partial perspective view of the rotary encoder shown in FIG. 1.

FIGS. 4 and 5 illustrate the rotary encoder 20 in the assembled state with the casing 41 removed for easy understanding. Further, the stop member 38 and the bearing 40 are omitted in FIG. 5 for easy understanding. The encoder sensor 39 extends to a position close to the rotation axis of the shaft 31 so that the encoder sensor 39 is able to sense the sensor slits 32b formed on the encoder disc 32.

When an outside diameter of the encoder disc 32 is reduced, a radius of the sensing area 32c is reduced along with the reduction the outside diameter of the encoder disc 32. As a result, the encoder sensor 39 needs to be further extended toward the rotation axis of the shaft 31. In other words, a distance "d" between a lower end of the encoder sensor 39 and the thin part 31c of the shaft 31 shown in FIGS. 4 and 5 needs to be reduced.

When the outside diameter of the encoder disc 32 is greatly reduced, the lower end of the encoder sensor 39 interferes with the boss part 35b. Although the outside diameter of the encoder disc 32 can also be reduced as the diameter of the thin part 31c is reduced, the reduction in diameter of the thin part 31c is limited. When a diameter of the boss part 35b is reduced to prevent the interference, a difference in diameters between the boss part 35b and the thin part 31c is reduced. In other words, the boss end face 35c has a reduced area for the encoder disc 32 to be attached thereto. As a result, the encoder disc 32 cannot be stably supported against the shaft 31.

In the present invention, since the encoder disc 32 is pressed toward the boss end face 35c of the disc supporting plate 35 from an opposite side thereof by means of elasticity of the elastic member 37, the encoder disc 32 can be firmly supported by the disc supporting plate 35 even when the encoder disc 32 has a reduced outside diameter. When the encoder disc 32 is fully pressed toward the boss end face 35c of the disc supporting plate 35, the encoder disc 32 can be fixed without using an adhesive.

Figure 6:
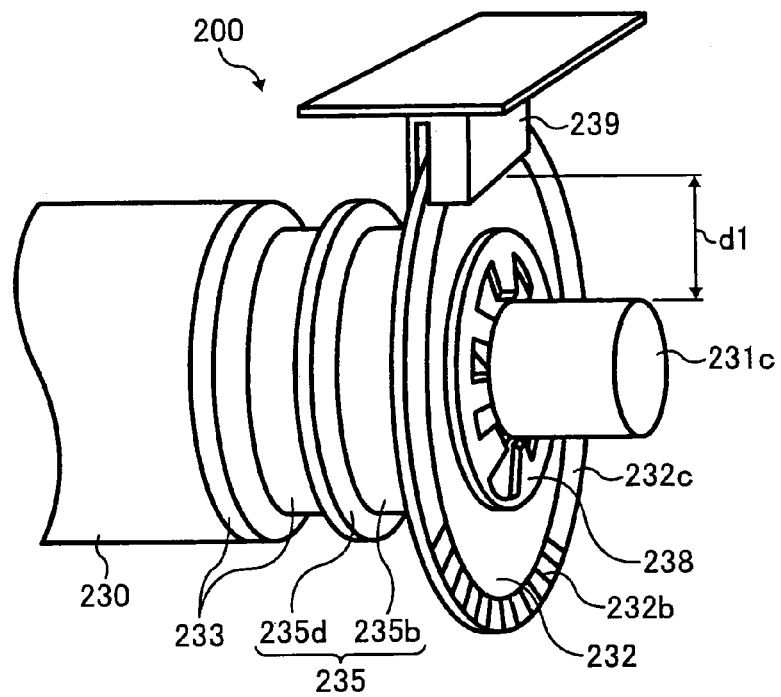
FIG. 6 is an enlarged partial perspective view of a rotary encoder including an encoder disc having a large diameter, shown as a comparative example.

FIG. 6 illustrates, as a comparative example, a rotary encoder 200 to which the present invention is not applied.

As shown in FIG. 6, the rotary encoder 200 includes a roller 230, a shaft 231 of the roller 230 having a thin part 231c, an encoder disc 232 having a plurality of sensor slits 232b and a sensing area 232c, a bearing roller 233, a disc supporting plate 235 having a flange part 235d and a boss part 235b, a retaining ring 238, and an encoder sensor 239.

The shaft 231 of the roller 230 is inserted into the bearing roller 233 and the disc support plate 235. The encoder disc 232 has a large diameter. One side of the encoder disc 232 is adhered and fixed to the boss part 235b, and another side of the encoder disc 232 is retained by the retaining ring 238 latched to the thin part 231c. The encoder disc 232 senses the sensor slits 232b formed in the sensing area 232c of the encoder disc 232. The encoder sensor 239 includes a lower end located at a distance "d1" from the thin part 231c of the shaft 231.

Although the rotary encoder 200 does not include an elastic member between the retaining ring 238 and the encoder disc 232, and the retaining ring 238 contacts the encoder disc 232, an attached area of the encoder disc 232 to the boss part 235b can be large since the encoder disc 232 has a large diameter and, therefore, the distance "d1" can be large.

However, when a diameter of the encoder disc 232 is greatly reduced with the above configuration, the distance "d1" is also reduced. As a result, the encoder disc 232 may not be firmly fixed, and the lower end of the encoder sensor 239 may interfere with the retaining ring 238.

In the present invention, the shaft 31 is integrally formed with the roller 30 as described above. Alternatively, the shaft 31 may be integrally formed with a rotating body other than a roller. Alternatively, the shaft 31 may not be integrally formed with any rotating body. Nonetheless, rotation speed of the shaft 31 and irregularities in rotation thereof can be detected, and can be controlled according to the present invention. The elastic material of the elastic member 37 is not limited to rubber. Alternatively, the elastic member 37 may include a tensible coil spring.

The elastic member 37 of the rotary encoder 20 according to the embodiment of the present invention preferably includes rubber having a hardness within a range of 60 to 90 degrees. The hardness is the JIS-A hardness, and is determined by a hardness measurement method based on Japanese Industrial Standards (JIS), K6253 Hardness testing method for vulcanized rubbers and thermoplastic rubbers. More preferably, the elastic member 37 has a hardness of JIS-A 80±5, which may vary in accordance with diameters of the shaft 31 and the encoder disc 32. The above range of 60 to 90 degrees is determined by taking into account a case in which a shape of the encoder disc 32 is changed. When the elastic member 37 including one of rubber and resin has a rubber hardness exceeding 90 degrees, the elastic member 37 has a large pressing force and the stop member 38 can hardly be fitted. On the other hand, when the elastic member 37 has a rubber hardness under 60 degrees, the elastic member 37 needs to be strongly pressed in the compression direction until enough pressing force to fix the encoder disc is obtained.

Figure 7:
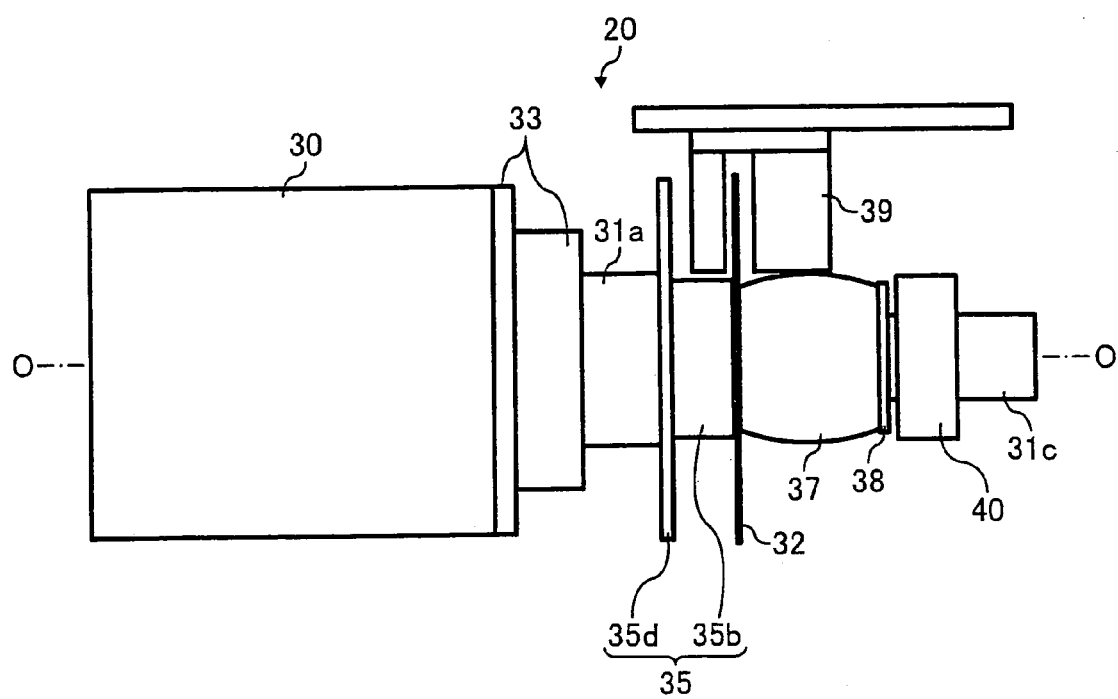
FIG. 7 is a front view of the major components of the rotary encoder shown in FIG. 1, illustrating deformation of an elastic member having a hardness of a low degree.

FIG. 7 illustrates the elastic member 37 strongly pressed as described above. As shown in FIG. 7, a middle part of the elastic member 37 is swollen in a direction perpendicular to the axial direction. As a result, the elastic member 37 may contact the lower end of the encoder sensor 39. When the amount in which the elastic member 37 is pressed is within a range of approximately 0.2 mm to 0.5 mm, influence of deformation as shown in FIG. 7 may be eliminated. Considering the influence of deformation, pressing force (approximately 5N to 15N) of rubber applied to the encoder disc 32, and easiness of assembly, the above range of 60 to 90 degrees is determined.

In a concrete example, the elastic member 37 is formed of urethane rubber having an outside diameter of 6.3 mm, an inside diameter of 4.0 mm, and a length in the axial direction of 6.5 mm. Pressing the elastic member 37 in a distance of 0.25 mm requires a pressing pressure of approximately 5N when the elastic member 37 has a hardness of 60 degrees, and a pressing pressure of approximately 20N when the elastic member 37 has a hardness of 90 degrees. Therefore, an appropriate range of hardness is 60 to 90 degrees to achieve a required pressing pressure of not less than 5N.

Figure 8:
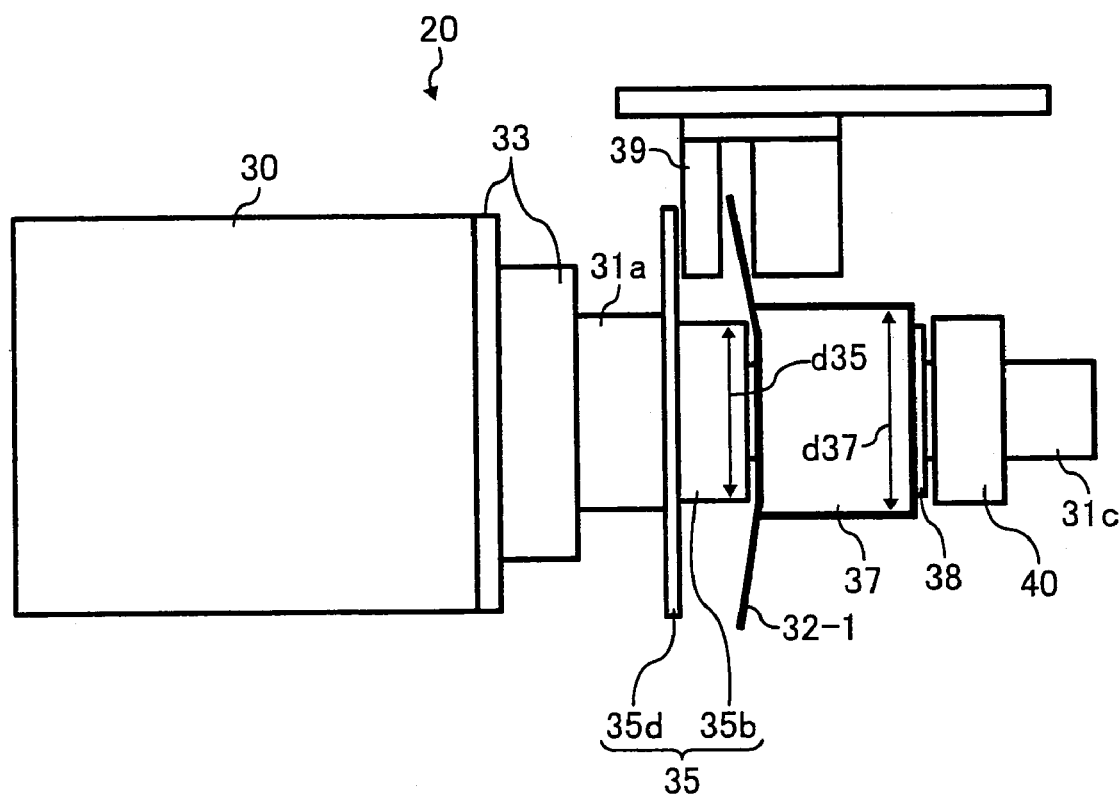
FIG. 8 is a front view of the major components of the rotary encoder shown in FIG. 1, illustrating deformation of the encoder disc.

An outside diameter of the elastic member 37 of the rotary encoder 20 according to the embodiment of the present invention is preferably smaller than an outside diameter of the boss end face 35c which is the part of the disc supporting member 35 abutting on the encoder disc 32. In a case in which the encoder disc 32 includes a resin, when the outside diameter d37 is larger than the outside diameter d35, pressing force applied to the elastic member 37 causes the encoder disc 32 to be deformed as shown by an encoder disc 32-1 in FIG. 8. Therefore, the outside diameter d37 of the elastic member 37 needs to be slightly smaller than the outside diameter d35 of the boss end face 35c.

The diameter of the center hole 37a of the elastic member 37 of the rotary encoder 20 according to the embodiment of the present invention, which is a hollow part formed in the elastic member 37, is preferably smaller than the diameter of the thin part 31c of the shaft 31 inserted into the center hole 37a. Having the smaller diameter than the diameter of the thin part 31c, the elastic member 37 has tightening force against the thin part 31c which facilitates positioning of the disc supporting plate 35. Further, the disc supporting plate 35 can be firmly retained along the rotation direction of the shaft 31. As a result, the encoder disc 35 can be further firmly fixed at a predetermined position.

Figure 9A:
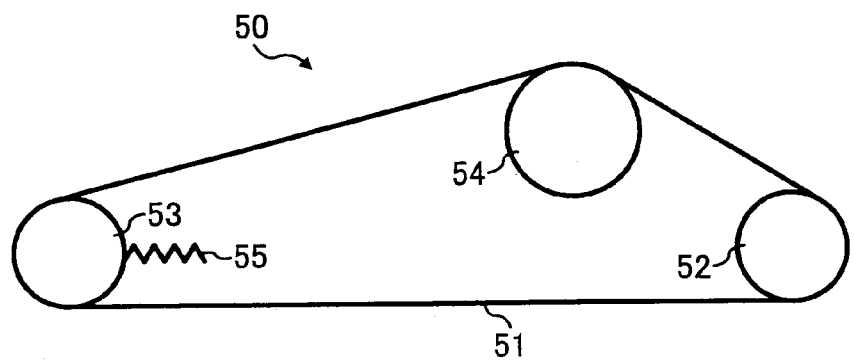
FIG. 9A is a front view of an exemplary belt conveyance apparatus including the rotary encoder shown in FIG. 1.
Figure 9B:
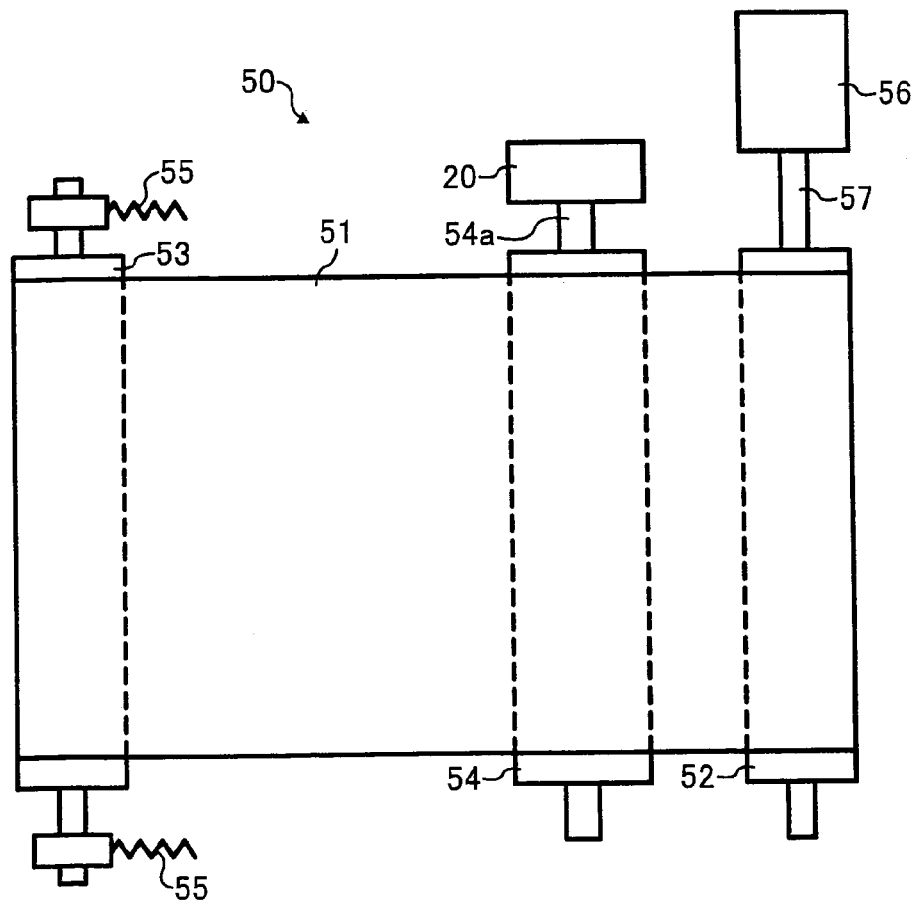
FIG. 9B is a plan view of the exemplary belt conveyance apparatus shown in FIG. 9A.

FIG. 9A is a front view of an exemplary belt conveyance apparatus 50 including the rotary encoder 20 according to the embodiment of the present invention. FIG. 9B is a plan view of the belt conveyance apparatus 50 shown in FIG. 9A.

As shown in FIGS. 9A and 9B, the belt conveyance apparatus 50 is an endless belt apparatus, and includes an endless belt 51, a drive roller 52 for circularly driving the endless belt 51, and a tension roller 53. The belt conveyance apparatus 50 further includes a driven roller 54 integrally formed with a driven roller shaft 54a, a tensible spring 55, a drive motor 56, and a drive roller shaft 57.

The tensible spring 55 for setting tensile stress on the endless belt 51 provides elastic force to the tension roller 53 which applies appropriate tensile force to the endless belt 51. The drive roller shaft 57 is integrally formed with the drive roller 52, and is connected to an output shaft (i.e. a motor shaft) of the drive motor 56 with a coupling (not shown).

The rotary encoder 20 according to the embodiment of the present invention is mounted to the driven roller shaft 54a of the driven roller 54. In the belt conveyance apparatus 50, the driven roller shaft 54a corresponds to the shaft 31 of the rotary encoder 20. The rotary encoder 20 senses angular velocity of the drive motor 56. The rotation speed of the drive motor 56 is shifted according to information of the sensed angular velocity to control the traveling speed of the endless belt 51. Further, control for eliminating irregularities in rotation is performed accordingly.

Examples of the belt conveyance apparatus 50 (i.e. the endless belt apparatus) includes a photoconductive belt apparatus (i.e. an endless belt photoconductive apparatus), a transfer belt conveyance apparatus (i.e. an endless belt apparatus for conveying a sheet-shaped medium and for transferring a toner image formed on a photoconductor onto the sheet-shaped medium), and an intermediate transfer belt conveyance apparatus for use in an electrophotographic image forming apparatus.

In the belt conveyance apparatus according to the present invention, a belt can stably travel. Further, the size of a rotary encoder can be reduced. As a result, the size of a belt conveyance apparatus can be reduced.

Figure 10:
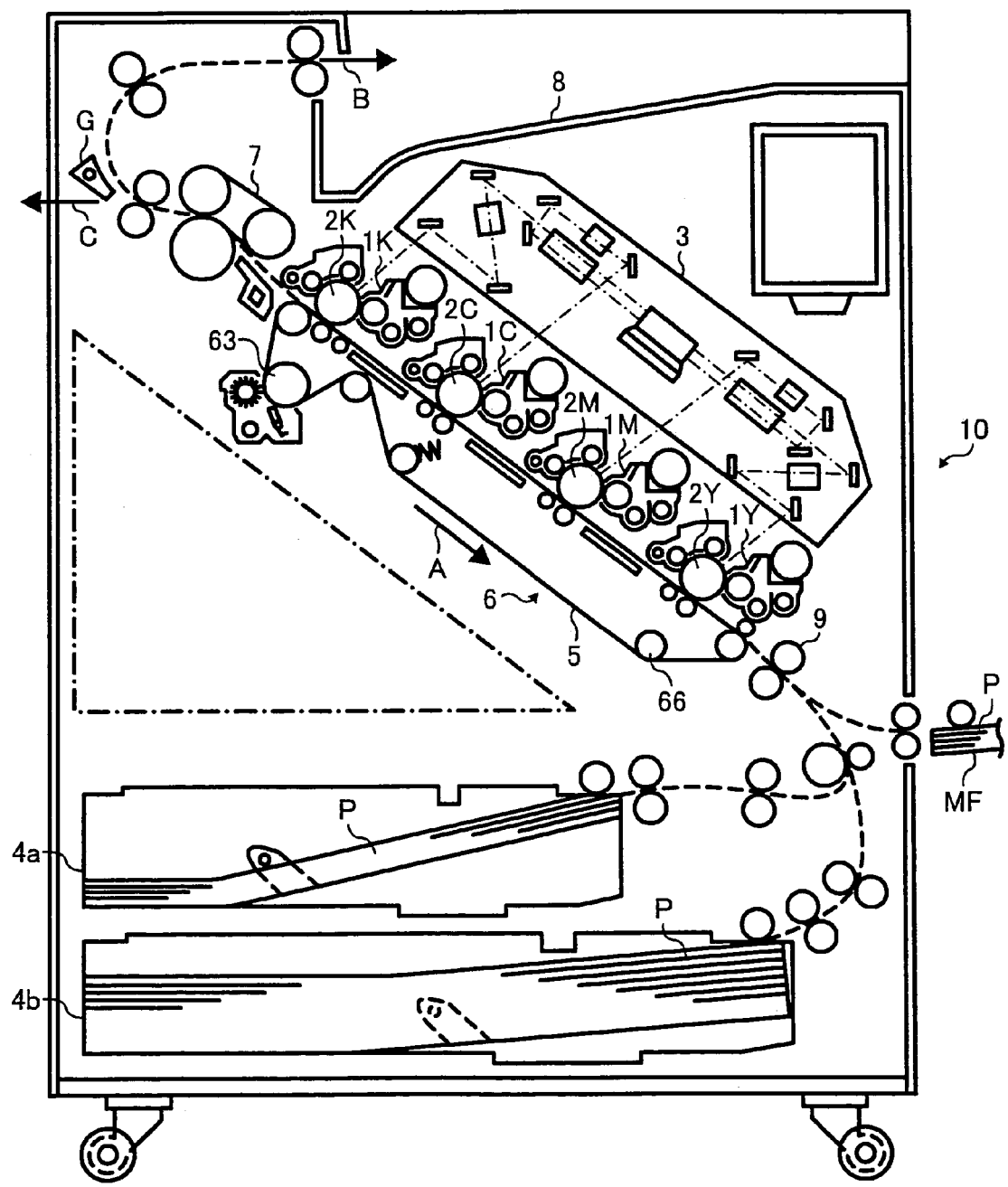
FIG. 10 is a cross section view of an exemplary electrophotographic image forming apparatus including a transfer belt conveyance apparatus having the rotary encoder shown in FIG. 1.

FIG. 10 is a cross section view of an exemplary image forming apparatus 10 including a transfer belt conveyance apparatus 6. The transfer belt conveyance apparatus 6 is one example of the above belt conveyance apparatus 50, and includes the rotary encoder 20 according to the embodiment of the present invention. The image forming apparatus 10 forms a full color image on a sheet-shaped medium such as a recording sheet (hereinafter, referred to as a sheet P) by using an electrophotographic method.

An exemplary configuration of the image forming apparatus 10 is described below referring to FIG. 10.

As shown in FIG. 10, the image forming apparatus 10 includes four image forming units 1Y, 1M, 1C, and 1K, an optical writing unit 3, sheet feeding cassettes 4a and 4b, a manual sheet feeding tray MF, a transfer belt 5, the transfer belt conveyance apparatus 6, a fixing unit 7, a selector guide G, a sheet discharge tray 8, and a pair of registration rollers 9.

The image forming units 1Y, 1M, 1C, and 1K include photoconductor drums 2Y, 2M, 2C, and 2K, respectively, which serve as image bearing members. Each of the image forming units 1Y, 1M, 1C, and 1K includes a charging unit, a development unit, and a cleaning unit.

The optical writing unit 3 includes a light source, a polygon mirror, an fθ lens, a reflective mirror, and so forth.

The transfer belt conveyance apparatus 6 includes a drive roller 63 and a driven roller 66. The rotary encoder 20 is mounted to a shaft of the driven roller 66.

The configuration and arrangement of components of the image forming apparatus 10 are described below in detail.

The image forming units 1Y, 1M, 1C, and 1K are arranged such that rotation axes of the respective photoconductor drums 2Y, 2M, 2C, and 2K are parallel to each other, and are positioned with predetermined intervals in a conveyance direction of the sheet P. The image forming units 1Y, 1M, 1C, and 1K form respective toner images in yellow, magenta, cyan, and black.

The optical writing unit 3 is located above the image forming units 1Y, 1M, 1C, and 1K, and emits light to irradiate and scan respective surfaces of the photoconductive drums 2Y, 2M, 2C, and 2K according to image data.

The transfer belt conveyance apparatus 6 is located under the image forming units 1Y, 1M, 1C, and 1K, and the transfer belt 5 therein bears and conveys the sheet P while rotating in a direction of an arrow A so that the sheet P passes through respective transfer positions of the image forming units 1Y, 1M, 1C, and 1K.

The fixing unit 7 includes a heating roller internally having a heating element, a driven roller, a fixing belt tightly stretched around the heating roller and the driven roller, and a pressing roller internally having a hearing element, and adopts a belt fixing method. The fixing unit 7 is located at one side of the transfer belt conveyance apparatus 6. The sheet discharge tray 8 is located above the transfer belt conveyance apparatus 6.

The sheet feeding cassette 4a and 4b and the manual sheet feeding tray MF are located under the image forming units 1Y, 1M, 1C, and 1K, and the sheet P is placed on each of the sheet feeding cassette 4a and 4b and the manual sheet feeding tray MF.

Operation of the image forming apparatus 10 is described below.

The sheet P fed from one of the sheet feeding cassette 4a, 4b, and the manual sheet feeding tray MF is conveyed by a conveyance roller while being guided by a conveyance guide (not shown). The sheet P is conveyed to a temporary stop position where the pair of registration rollers 9 is located. The sheet P is then carried out in predetermined timing by the pair of registration rollers 9, and is born and conveyed by the transfer belt 5 to the respective transfer positions of the image forming units 1Y, 1M, 1C, and 1K.

Toner images in the respective colors formed on the photoconductive drums 2Y, 2M, 2C, and 2K in the image forming units 1Y, 1M, 1C, and 1K are sequentially superimposed on the sheet P at the respective transfer positions to form a full color toner image thereon by means of an electric field and nip pressure. After the toner images are transferred onto the sheet P, the surfaces of the photoconductor drums 2Y, 2M, 2C, and 2K are cleaned by the cleaning unit, and residual static electricity thereon is removed to prepare for forming next electrostatic latent images.

Further, the sheet P with the full color image formed on one side thereof is conveyed into the fixing unit 7 where the full color toner image is fixed. Then, the sheet P is conveyed in one of a first discharge direction B and a second discharge direction C according to a rotation angle of the selector guide G. In the case the sheet P is conveyed in the first discharge direction B and is discharged onto the sheet discharge tray 8, the sheet P is discharged with the side having the full color image facing down.

On the other hand, in the case the sheet P is conveyed in the second discharge direction C, the sheet P is conveyed to one of a postprocessing apparatus such as a sorting apparatus and a binding apparatus (not shown) and the pair of registration rollers 9 via a switchback unit for double-sided image forming.

The rotary encoder 20 provided on the shaft of the driven roller 66 obtains angle velocity information. The transfer conveyance belt apparatus 6 including the rotary encoder 20 changes the rotation speed of the drive roller 63 according the obtained angle velocity information to control the traveling speed of the transfer belt 5.

The image forming apparatus 10 including the transfer belt conveyance apparatus 6 may output an image with improved quality. Further, the size of the image forming apparatus 10 can be reduced along with the size reduction of the rotary encoder 20.

Figure 11:
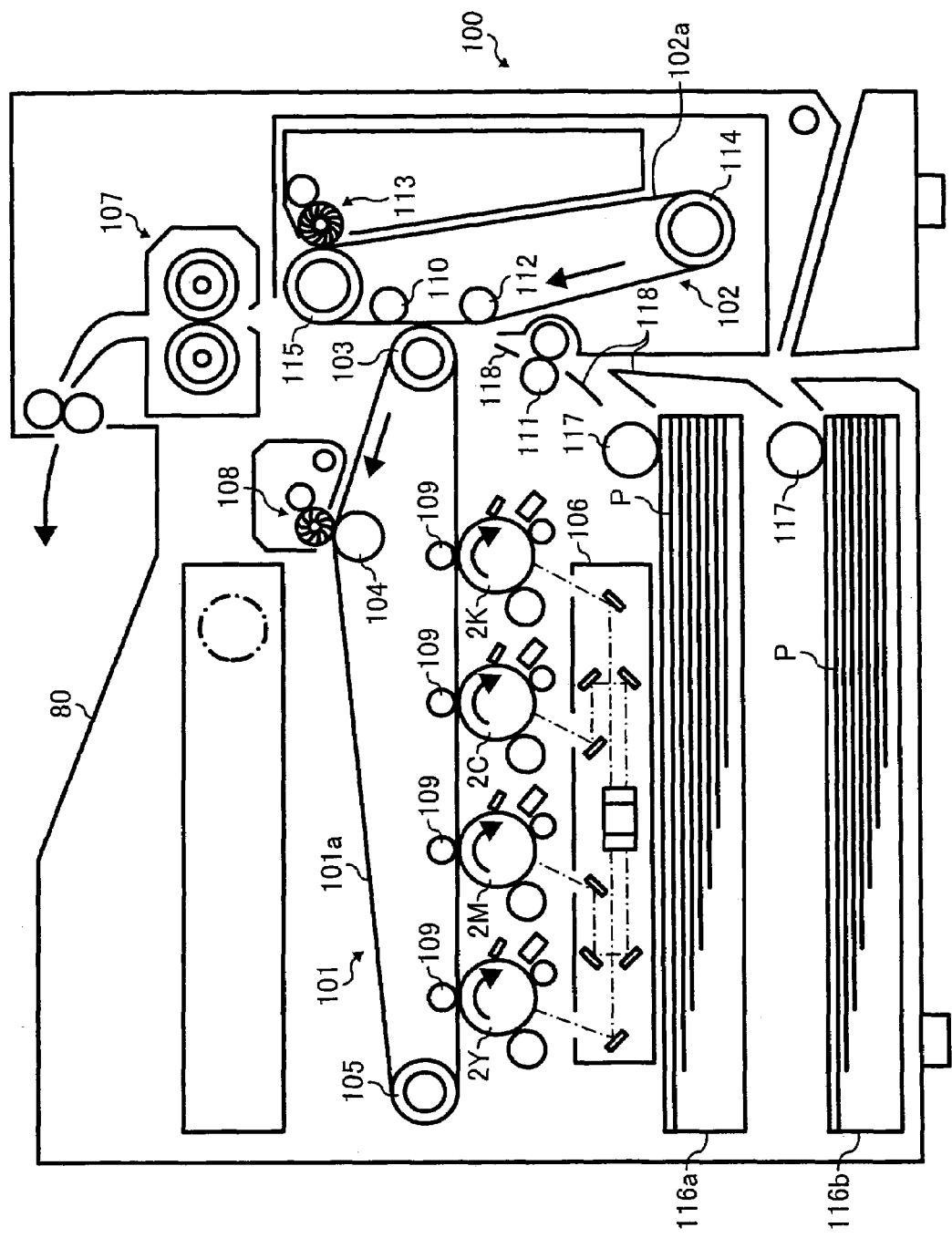
FIG. 11 is a cross section view of an exemplary electrophotographic image forming apparatus including at least one intermediate transfer belt conveyance apparatus having the rotary encoder shown in FIG. 1.

FIG. 11 is a cross section view of an exemplary image forming apparatus 100 including at least one intermediate transfer belt conveyance apparatus having the rotary encoder 20 according to the embodiment of the present invention. The image forming apparatus 100 includes a first intermediate transfer belt conveyance apparatus 101 and a second intermediate transfer belt conveyance apparatus 102. The first and second intermediate transfer belt conveyance apparatuses 101 and 102 are examples of the above belt conveyance apparatus 50, and includes the rotary encoder 20 according to the embodiment of the present invention. The image forming apparatus 100 forms a full color image by using an electrophotographic method.

An exemplary configuration of the image forming apparatus 100 is described below referring to FIG. 11.

As shown in FIG. 11, the image forming apparatus 100 includes photoconductive drums 2Y, 2M, 2C, and 2K, a sheet discharge tray 80, the first intermediate transfer belt conveyance apparatus 101, the second intermediate transfer belt conveyance apparatus 102, an optical writing unit 106, a fixing unit 107, a first cleaning unit 108, a pair of registration rollers 111, a second cleaning unit 113, sheet feeding cassette 116a and 116b, sheet feeding rollers 117, and sheet guide members 118.

The first intermediate transfer belt conveyance apparatus 101 includes an intermediate transfer belt 101a, a drive roller 103, a driven roller 104 having a shaft provided with the rotary encoder 20, a supporting roller 105, and a plurality of first transfer rollers 109.

The second intermediate transfer belt conveyance apparatus 102 includes an intermediate transfer belt 102a, a second transfer roller 110, a backing roller 112, a drive roller 114, and a driven roller 115 having a shaft provided with the rotary encoder 20.

The configuration and arrangement of components of the image forming apparatus 100 are described below in detail.

In the first intermediate transfer belt conveyance apparatus 101, the supporting roller 105 supports the intermediate transfer belt 101a together with the drive roller 103 and the driven roller 104. The optical writing unit 106 emits light so that the photoconductive drums 2Y, 2M, 2C, and 2K are irradiated therewith. The fixing unit 107 fixes an image formed on a sheet P. The first cleaning unit 108 removes residual toner on the intermediate transfer belt 101a. The intermediate transfer belt 101a runs between the photoconductive drums 2Y, 2M, 2C, and 2K and the plurality of first transfer rollers 109. The plurality of first transfer rollers 109 are located in respective first transfer positions opposite to the photoconductive drums 2Y, 2M, 2C, and 2K along the intermediate transfer belt 101a, and transfer respective toner images on the photoconductive drums 2Y, 2M, 2C, and 2K are transferred onto the intermediate transfer belt 101a at the respective first transfer positions.

The second transfer roller 110 and the backing roller 112 are located at positions substantially opposite to the drive roller 103, with the intermediate transfer belts 101a and 102a located therebetween. The second transfer roller 110 and the backing roller 112 apply tensile force to the intermediate transfer belt 102a so that the intermediate transfer belt 102a contacts the intermediate transfer belt 101a looped over the drive roller 103 at a second transfer position. The pair of registration rollers 111 causes the sheet P carried out from one of the sheet feeding cassettes 116a and 116b by the sheet feeding roller 117 to stop, and conveys the sheet P in appropriate timing to the second transfer position. The second cleaning unit 113 removes residual toner on the intermediate transfer belt 102a. The sheet guide members 118 guide the sheet P fed from one of the sheet feeding cassettes 116a and 116b so that the sheet P passes through the pair of registration rollers 111 and is conveyed to a transfer position.

Operation of the image forming apparatus 100 is described below.

Respective toner images on the photoconductor drums 2Y, 2M, 2C, and 2K are transferred onto the intermediate transfer belt 10a of the first intermediate transfer belt conveyance apparatus 101 and sequentially superimposed at respective positions of the first transfer rollers 109 to form a full color toner image. The full color toner image formed on the intermediate transfer belt 101a is transferred onto the intermediate transfer belt 102a of the second intermediate transfer belt conveyance apparatus 102 at the second transfer position. The full color toner image transferred onto the intermediate transfer belt 102a is conveyed thereon, and is further transferred onto the sheet P at a third transfer position located at the same position as the second transfer position. The residual toner on the intermediate transfer belt 102a is removed by the second cleaning unit 113. The full color toner image transferred onto the sheet P is fixed by the fixing unit 107 by means of heat, and is discharged into the sheet discharge tray 80.

The rotary encoder 20 provided on the shaft of the driven roller 104 obtains angle velocity information. The first intermediate transfer belt conveyance apparatus 101 including the rotary encoder 20 changes the rotation speed of the drive roller 103 according to the obtained angle velocity information to control the traveling speed of the intermediate transfer belt 101a.

The rotary encoder 20 provided on the shaft of the driven roller 115 obtains angle velocity information. The second intermediate transfer belt conveyance apparatus 102 including the rotary encoder 20 changes the rotation speed of the drive roller 114 according to the obtained angle velocity information to control the traveling speed of the intermediate transfer belt 102a.

The image forming apparatus 100 including the first and second intermediate transfer belt conveyance apparatuses 101 and 102 may output an image with improved quality. Further, the size of the image forming apparatus 100 can be reduced along with the size reduction of the rotary encoder 20.

Application of the present invention is not limited to an image forming apparatus. Alternatively, the present invention may be applied to an apparatus including a member having a small diameter, in which an area contacting an encoder is small.

This patent specification is based on Japanese patent applications, No. JP2005-317364 filed on Oct. 31, 2005, in the Japan Patent Office, the entire contents of which are incorporated by reference herein.

What is claimed as new and desired to be secured by Letters Patent of the United States is:

1. A rotary encoder, comprising:
a shaft configured to serve as a rotation axis;
a disc supporting plate fixed to the shaft;
an encoder disc having a center hole, a first side face, and a second side face opposing the first side face, wherein the first side face is contacted with a surface of the disc supporting plate and the shaft is inserted into the center hole of the encoder disc;
an elastic member configured to contact and press the second side face of the encoder disc; and
a retaining member configured to retain the second side face of the encoder disc via the elastic member.

2. The rotary encoder according to claim 1, wherein the elastic member has a cylindrical shape with a hollow portion, and the shaft is inserted into the hollow portion.

3. The rotary encoder according to claim 2, wherein the elastic member has a hardness of 60 to 90 degrees.

4. The rotary encoder according to claim 2, wherein the hollow portion of the elastic member, before the shaft is inserted thereinto, has a diameter smaller than a diameter of a part of the shaft inserted thereinto.

5. The rotary encoder according to claim 1, wherein the elastic member is configured to have an outside diameter smaller than a diameter of a part of the disc supporting plate contacting the encoder disc.

6. The rotary encoder according to claim 1, further comprising:
an encoder sensor disposed to the encoder disc.

7. The rotary encoder according to claim 6, wherein the encoder disc includes sensor slits located in a sensing area.

8. The rotary encoder according to claim 7, wherein the encoder sensor includes a light emitting part and a light receiving part configured to detect the sensor slits.

9. The rotary encoder according to claim 1, further comprising:
a casing configured to cover the disc supporting plate, the encoder disc, the elastic member, and the retaining member.

10. The rotary encoder according to claim 9, wherein the casing includes a bearing holding member configured to receive a bearing and a bearing opening disposed to the encoder sensor.

11. The rotary encoder according to claim 1, further comprising:
a bearing configured to rotatably support the shaft.

12. The rotary encoder according to claim 1, wherein the shaft includes a stop groove configured to receive the retaining member.

13. The rotary encoder according to claim 1, wherein the shaft includes a key groove configured to receive a detent key disposed to the disc supporting plate.

14. The rotary encoder according to claim 1, further comprising:
a roller integrally formed with the shaft.

15. A belt conveyance apparatus, comprising:
an endless belt; and
a roller configured to rotate the endless belt, including:
a shaft integrally formed with the roller; and
the rotary encoder according to claim 1, wherein the rotary encoder is provided on the shaft of the roller.

16. An electrophotographic image forming apparatus, comprising:
an image forming unit configured to form a toner image on a receiving material; and
a transfer belt conveyance apparatus configured to transport the receiving material, wherein the transfer belt conveyance apparatus is the belt conveyance apparatus according to claim 15.

17. A rotary encoder, comprising:
a shaft configured to serve as a rotation axis;
a disc supporting plate fixed to the shaft;
an encoder disc having a center hole, a first side face, and a second side face opposing the first side face, wherein the first side face is contacted with a surface of the disc supporting plate and the shaft is inserted into the center hole of the encoder disc;
a pressing means configured to contact and press the second side face of the encoder disc; and
a retaining member configured to retain the second side face of the encoder disc via the pressing means.

18. The rotary encoder according to claim 17, further comprising:
an encoder sensor disposed to the encoder disc, wherein the encoder sensor includes a light emitting part and a light receiving part configured to detect sensor slits located in a sensing area of the encoder disc.

19. The rotary encoder according to claim 17, further comprising:
a casing configured to cover the disc supporting plate, the encoder disc, the pressing means, and the retaining member.

20. The rotary encoder according to claim 17, further comprising:
a bearing configured to rotatably support the shaft.

* * * * *